US010579549B2

United States Patent
Mishra et al.

(10) Patent No.: US 10,579,549 B2
(45) Date of Patent: Mar. 3, 2020

(54) STAGGERED TRANSMISSIONS ON A MULTI-DROP HALF-DUPLEX BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/162,583

(22) Filed: Oct. 17, 2018

(65) Prior Publication Data
US 2019/0171590 A1    Jun. 6, 2019

Related U.S. Application Data

(60) Provisional application No. 62/594,955, filed on Dec. 5, 2017.

(51) Int. Cl.
| | | |
|---|---|---|
| *G06F 13/36* | (2006.01) | |
| *G06F 13/16* | (2006.01) | |
| *G06F 3/06* | (2006.01) | |
| *H04B 7/26* | (2006.01) | |
| *H04L 25/497* | (2006.01) | |
| *H04L 12/40* | (2006.01) | |
| *G06F 13/42* | (2006.01) | |

(52) U.S. Cl.
CPC ........ *G06F 13/1663* (2013.01); *G06F 3/0655* (2013.01); *G06F 13/4291* (2013.01); *H04B 7/26* (2013.01); *H04L 12/40* (2013.01); *H04L 12/40045* (2013.01); *H04L 25/497* (2013.01)

(58) Field of Classification Search
CPC combination set(s) only.
See application file for complete search history.

(56) References Cited

U.S. PATENT DOCUMENTS

| | | | |
|---|---|---|---|
| 6,542,947 | B1 | 4/2003 | Buehring et al. |
| 9,569,390 | B2 * | 2/2017 | Rudy .................... G06F 13/385 |
| 2013/0282807 | A1 | 10/2013 | Rudy et al. |
| 2016/0173443 | A1 * | 6/2016 | Hein ........................ G06F 13/42 |
| | | | 370/254 |
| 2018/0357194 | A1 * | 12/2018 | Ulmer ................. G06F 13/3625 |
| 2019/0081806 | A1 * | 3/2019 | Hansing .................. H04L 12/10 |

OTHER PUBLICATIONS

International Search Report and Written Opinion—PCT/US2018/056549—ISA/EPO—dated Feb. 22, 2019.

* cited by examiner

*Primary Examiner* — Raymond N Phan
(74) *Attorney, Agent, or Firm* — Loza & Loza LLP

(57) ABSTRACT

Systems, methods, and apparatus for optimizing bus latency associated with a serial bus using staggered bidirectional transmission within a transaction or datagram are described. A method performed at a device coupled to a serial bus includes initiating a transaction between the first device and a second device to exchange a datagram with the second device in a first direction over the serial bus, and exchanging one or more bytes of data with the second device in a second direction over the serial bus before the datagram has been completely transmitted. The first device and the second device alternate as transmitters on the serial bus such that direction of data transmission is staggered on the serial bus. The serial bus may be operated in accordance with an I3C, RFFE, SPMI, or other protocol.

30 Claims, 13 Drawing Sheets

STAGGERED TRANSMISSIONS ON A MULTI-DROP HALF-DUPLEX BUS

PRIORITY CLAIM

This application claims priority to and the benefit of U.S. Provisional Patent Application Ser. No. 62/594,955 filed in the U.S. Patent Office on Dec. 5, 2017, the entire content of this application being incorporated herein by reference as if fully set forth below in its entirety and for all applicable purposes.

TECHNICAL FIELD

The present disclosure relates generally to serial communication over a shared serial bus and, more particularly, to optimizing latencies associated with the shared serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, such as a multi-drop serial bus or a parallel bus. General-purpose serial interfaces are known in the industry, including the Inter-Integrated Circuit (I2C or I²C) serial bus and its derivatives and alternatives. Certain serial interface standards and protocols are defined by the Mobile Industry Processor Interface (MIPI) Alliance, including the I3C, system power management interface (SPMI), and the Radio Frequency Front-End (RFFE) interface standards and protocols.

The I3C serial bus is a serial bus that has an intended use in connecting sensors and other peripherals to a processor. In some implementations, multiple bus masters are coupled to the serial bus such that two or more devices can serve as bus master for different messages transmitted on the serial bus. RFFE standards and protocols define a communication interface that may be used for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links. SPMI standards and protocols define a hardware interface that may be implemented between baseband/application processors and peripheral components. In some implementations, SPMI is implemented to support power management operations within a device.

In many instances, a multi-drop serial interface may be provided to support high-priority, low-latency communication between an application processor and certain peripherals, and other lower-priority communication. Latency can be adversely affected when multiple devices coupled to the serial bus are concurrently active. Degraded latencies can lead to an increase in dropped packets, session timeouts and retransmissions on the serial bus. As mobile communication devices continue to include a greater level of functionality, improved serial communication techniques are needed to improve latencies and/or handling of priority traffic on a serial bus that couples peripherals and application processors.

SUMMARY

Certain aspects of the disclosure relate to systems, apparatus, methods and techniques that can support staggered transmission on a serial bus.

In various aspects of the disclosure, a method performed at a device coupled to a serial bus includes initiating a transaction between the first device and a second device to exchange a datagram with the second device in a first direction over the serial bus, and exchanging one or more bytes of data with the second device in a second direction over the serial bus before the datagram has been completely transmitted. The first device and the second device alternate as transmitters on the serial bus such that direction of data transmission is staggered on the serial bus. The serial bus may be operated in accordance with an I3C, RFFE, SPMI, or other protocol.

In one aspect, initiating the transaction between the first device and the second device includes transmitting a start condition or participating in a bus arbitration process, and a device address from the first device on the serial bus, the device address identifying the second device, and transmitting a command from the first device to the second device over the serial bus to identify a type of exchange to be executed in the first direction over the serial bus.

In various aspects of the disclosure, a processor-readable storage medium has one or more instructions stored thereon. The instructions may be executed by at least one processor or state machine in a processing circuit. The instructions may cause the processing circuit to initiate a transaction between a first device and a second device to exchange a datagram in a first direction over the serial bus, and exchange one or more bytes of data in a second direction over the serial bus before the datagram has been completely transmitted. The two devices may alternate as transmitters on the serial bus such that direction of data transmission is staggered on the serial bus. The serial bus may be operated in accordance with an I3C, RFFE, SPMI, or other protocol.

In various aspects of the disclosure, an apparatus includes means for initiating a transaction between a first device and a second device to exchange a datagram in a first direction over the serial bus, and means for exchanging one or more bytes of data in a second direction over the serial bus before the datagram has been completely transmitted. The two devices may alternate as transmitters on the serial bus such that direction of data transmission is staggered on the serial bus. The serial bus may be operated in accordance with an I3C, RFFE, SPMI, or other protocol.

In various aspects of the disclosure, a first device adapted for communicating over a serial bus has an interface circuit adapted to couple the apparatus to the serial bus, and a processor. The processor may be configured to initiate a transaction between the first device and a second device to exchange a datagram with the second device in a first direction over the serial bus, and exchange one or more bytes of data with the second device in a second direction over the serial bus before the datagram has been completely transmitted. The first device and the second device alternate as transmitters on the serial bus such that direction of data transmission is staggered on the serial bus.

DETAILED DESCRIPTION

Figure 1:
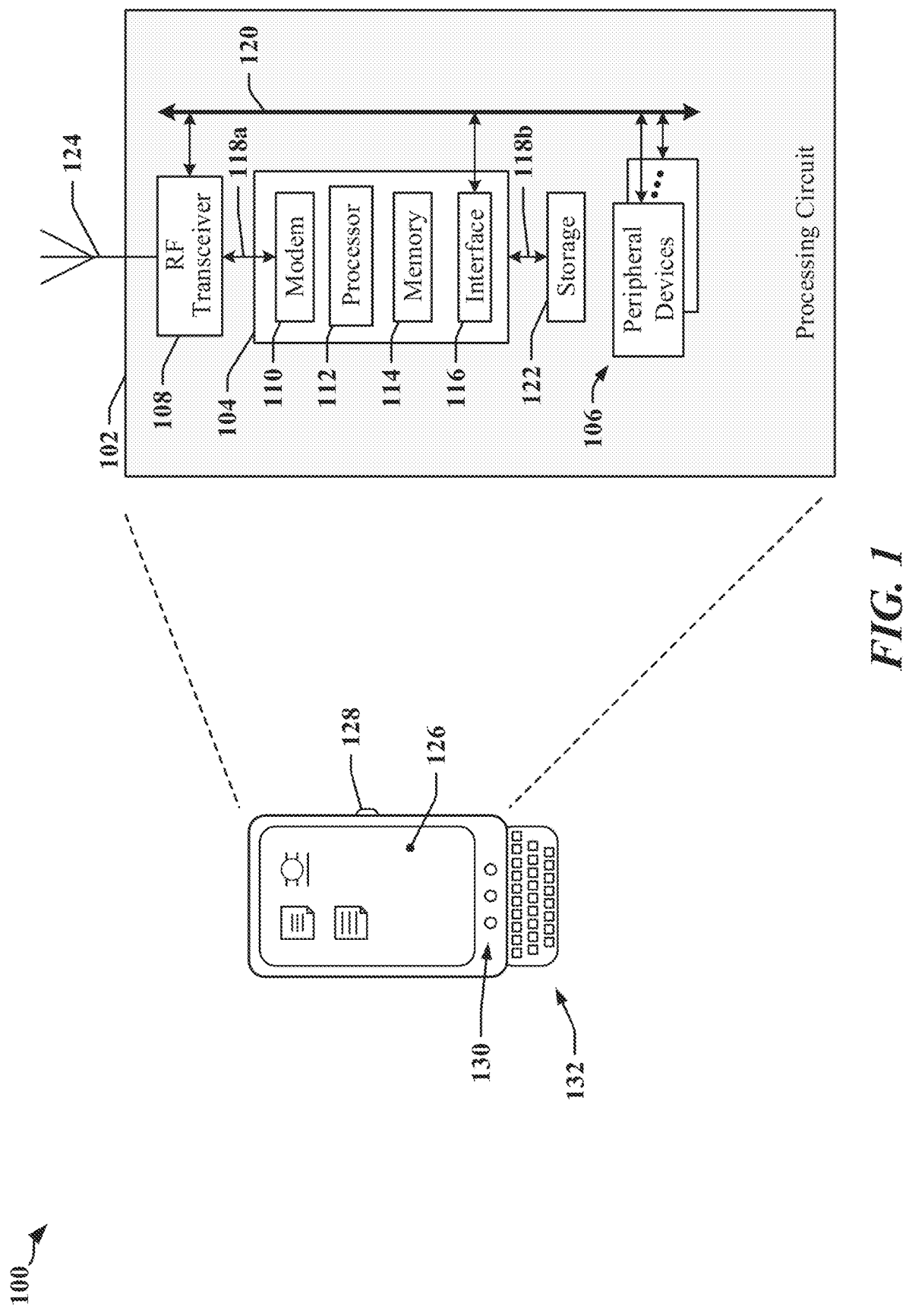
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, a serial bus may be operated in accordance I2C, I3C, SPMI, and/or RFFE protocols, which are typically defined and/or configured for half-duplex operation.

Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration and/or command transmissions specified by protocol.

In some implementations, a brute-force approach to reducing latency includes increasing transmission clock frequency. Increased clock frequencies are associated with increased power consumption within devices that are sensitive to battery life, and may cause increased electromagnetic interference.

According to certain aspects disclosed herein, devices that are parties to a transaction on a half-duplex serial bus can exchange data bi-directionally within a single transaction established between two devices coupled to the serial bus. Devices paired for the duration of a transaction may exchange payload and control data in both directions. In conventional implementations, half-duplex communication is implemented using master-initiated polling or slave-initiated bus arbitration to control direction of data transmission over the serial bus. The protocol overhead associated with polling and bus arbitration contribute significantly to bus latency.

In certain aspects disclosed herein, two devices may be paired for the duration of a transaction, or for a series of transactions during which bidirectional communication is enabled. In one example, a "full-duplex transaction" may be established over a half-duplex serial link to transmit a multi-byte datagram in a forward direction while permitting one or more bytes to be transmitted in the reverse direction. In one example, data is transmitted in a forward direction from a master device to a slave device during a write transaction. In another example, data is transmitted in a forward direction from a slave device to a master device during a read transaction. In some examples, the forward direction may be assigned to any communication from the master device to a slave device and the reverse direction may be assigned to any communication from the slave device to the master device.

According to various aspects, transmissions in forward and reverse directions over a half-duplex serial bus may be alternated and the master and salve devices may exchange unrelated data in the two directions. For example, a master device may write configuration data to the slave device while the slave device is transmitting status information to the master device within the same transaction. The master device may initiate the transaction to send a datagram to the slave device and the master device may be prepared to receive reverse data while the datagram is being sent. The techniques and procedures disclosed herein do not require the master device to transmit bus-turnaround commands within the datagram. The techniques and procedures disclosed herein can reduce overall bus latency and prevent timeouts, dropped packets and missed status and/or events that may otherwise arise when conventional bus management protocols are used to facilitate bidirectional communication over the serial bus. The techniques and procedures disclosed herein can be implemented in a variety of multi-drop serial bus architectures, including serial buses that are operated in accordance with RFFE, I3C and SPMI protocols.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include a processing circuit 102 coupling multiple components and/or devices 104, 106 and/or 108, and which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may include one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
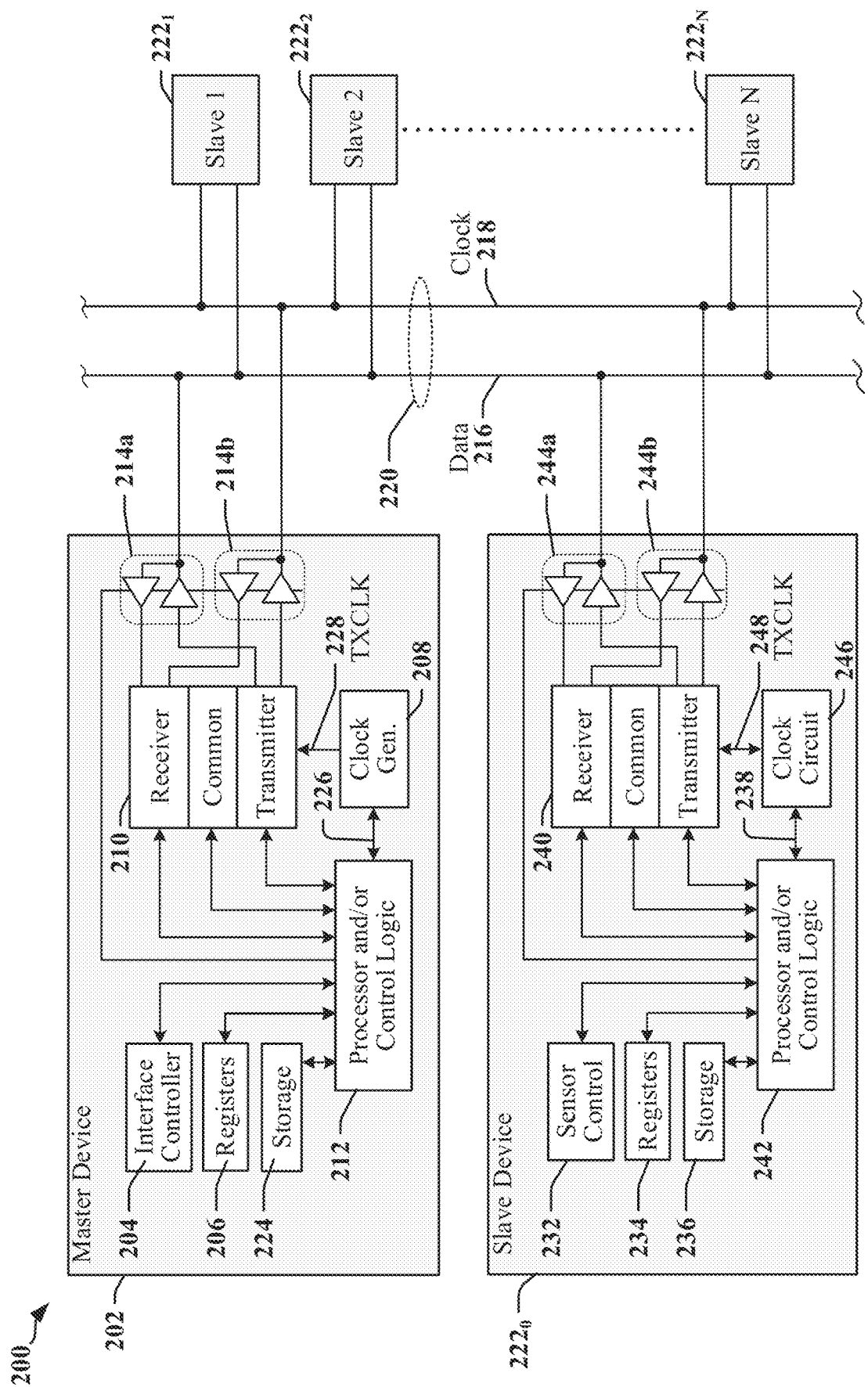
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master 202. Certain types of bus can support multiple bus master devices 202.

In one example, a bus master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The bus master device 202 may include configuration registers 206 or other storage 224, and other control logic 212 configured to handle protocols and/or higher level functions. The control logic 212 may include a processing circuit such as a state machine, sequencer, signal processor or general-purpose processor. The bus master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or other protocols. At least one device 202, $222_0$-$222_N$ may be configured to operate as a master device and a slave device on the serial bus 220. Two or more devices 202, $222_0$-$222_N$ may be configured to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Figure 3:
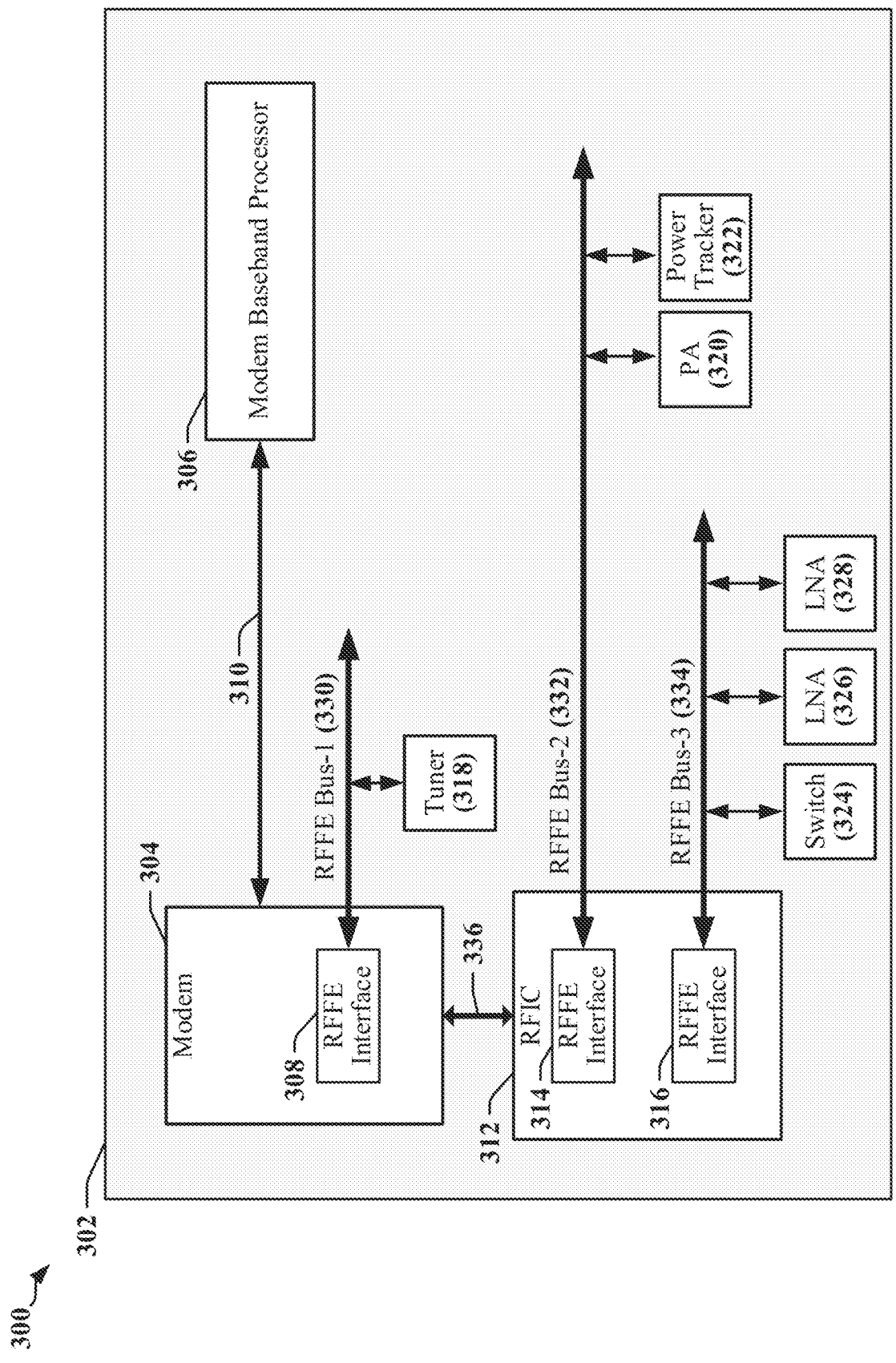
FIG. 3 illustrates a device that employs an RFFE bus to couple various radio frequency front-end devices.

FIG. 3 is a block diagram 300 illustrating an example of a device 302 that includes RFFE front-end devices 318, 320, 322, 324, 326 328. Multiple RFFE buses 330, 332, 334 are provided to couple various combinations of the devices. In this example, a modem 304 includes an RFFE interface 308 that couples the modem 304 to a first RFFE bus 330. The modem 304 may communicate with a baseband processor 306 and a Radio-Frequency IC (RFIC 312) through one or more communication links 310, 336. The illustrated device 302 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the device 302 may be implemented with one or more baseband processors 306, modems 304, RFICs 312, multiple communications links 310, 336, multiple RFFE buses 330, 332, 334 and/or other types of buses. The device 302 may include other processors, circuits, modules and may be configured for various operations and/or different functionalities. In the example illustrated in FIG. 3, the Modem is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and the second RFFE bus 332. The RFIC 312 may communicate with a switch 324 and one or more LNAs 326, 328.

Figure 4:
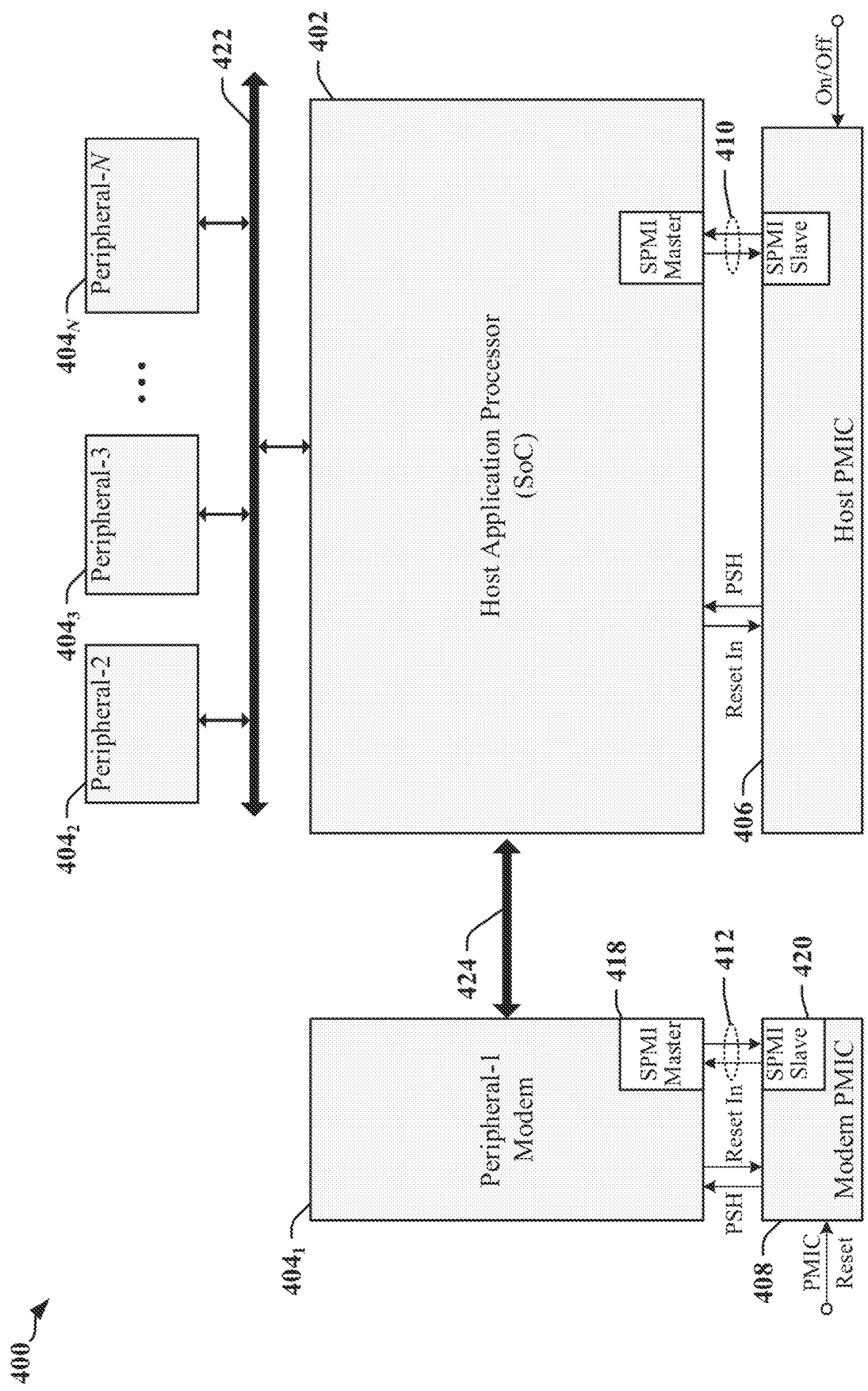
FIG. 4 illustrates a device that employs an SPMI bus to couple various devices in accordance with certain aspects disclosed herein.

The MIPI Alliance SPMI standards and protocols specify a hardware interface that may be implemented between baseband or application processors and peripheral components to support a variety of data communication functions including data communication related to power management operations. FIG. 4 illustrates an example of a system 400 which includes data communication links 410, 412, where each of the data communication links 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem 4041 with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be may be used as a shared bus that provides high-speed, low-latency connection for devices, where data transmissions may be managed, according to priorities assigned to different traffic classes.

The system 400 includes an application processor 402 that may serve as a host device on various data communication links 410, 422, multiple peripherals $404_1$-$404_N$, and one or more PMICs 406. The application processor 402 and the modem 4041 may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408. The application processor 402 may be coupled to each of the peripherals $404_1$-$404_N$ using different types of data communication links 410, 412. For example, the data communication links 410, 412 may be operated in accordance with one or more protocols such as the RFFE, SPMI, I3C protocols.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a transaction in process on the serial bus, the time to transmit commands causing bus turnaround between transmit mode and receive mode, bus arbitration and/or command transmissions specified by protocol.

Figure 5:
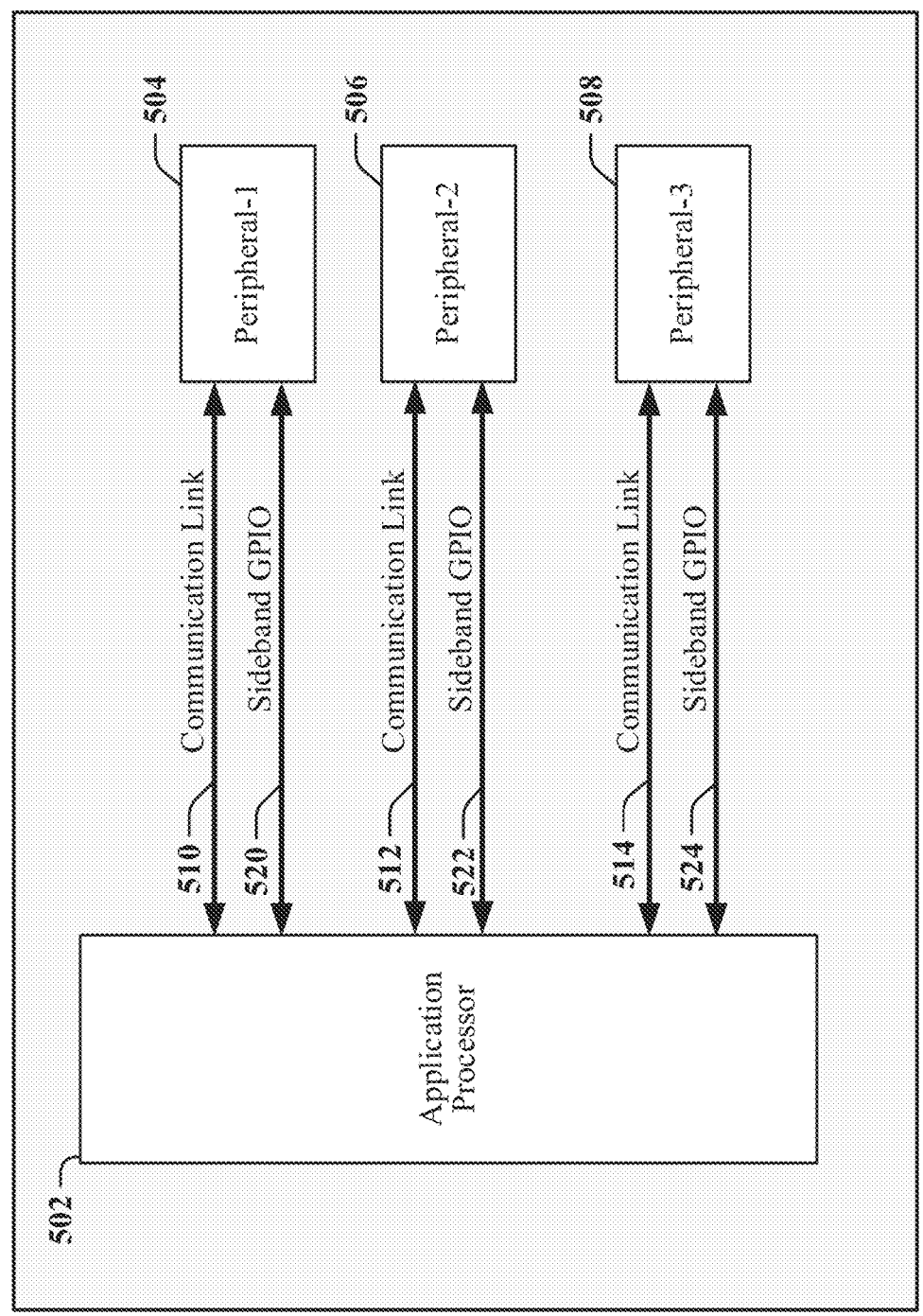
FIG. 5 illustrates an apparatus that includes an application processor coupled to multiple peripheral devices.

A virtual GPIO message is one example of low-latency messages. Mobile communication devices, and other devices that are related or connected to mobile communication devices, increasingly provide greater capabilities, performance and functionalities. In many instances, a mobile communication device incorporates multiple IC devices that are connected using a variety of communication links. For example, FIG. 5 illustrates an apparatus 500 that includes an Application Processor 502 and multiple peripheral devices 504, 506, 508. In the example, each peripheral device 504, 506, 508 communicates with the Application Processor 502 over a respective communication link 510, 512, 514 that may be operated in accordance with mutually different protocols. Communication between the Application Processor 502 and each peripheral device 504, 506, 508 may involve additional wires that carry control or command signals between the Application Processor 502 and the peripheral devices 504, 506, 508. These additional wires may be referred to as sideband GPIO 520, 522, 524, and in some instances the number of connections needed for sideband GPIO 520, 522, 524 can exceed the number of connections used for a communication link 510, 512, 514.

GPIO includes generic pins/connections that may be customized for particular applications. For example, a GPIO pin may be programmable to function as an output, input pin or a bidirectional pin, in accordance with application needs. In one example, the Application Processor 502 may assign and/or configure a number of GPIO pins to conduct handshake signaling or inter-processor communication (IPC) with a peripheral device 504, 506, 508 such as a modem. When handshake signaling is used, sideband signaling may be symmetric, where signaling is both transmitted and received by the Application Processor 502 and a peripheral device 504, 506, 508. With increased device complexity, the increased number of GPIO pins used for IPC communication may significantly increase manufacturing cost and limit GPIO availability for other system-level peripheral interfaces. In some devices, the state of GPIO associated with a communication link, may be captured, serialized and transmitted over a data communication link. In one example, captured GPIO state may be transmitted as virtual GPIO (VGI) messages in packets over a multi-drop, serial bus operated in accordance with an RFFE, I2C, I3C, SPMI, or other protocol.

Figure 6:
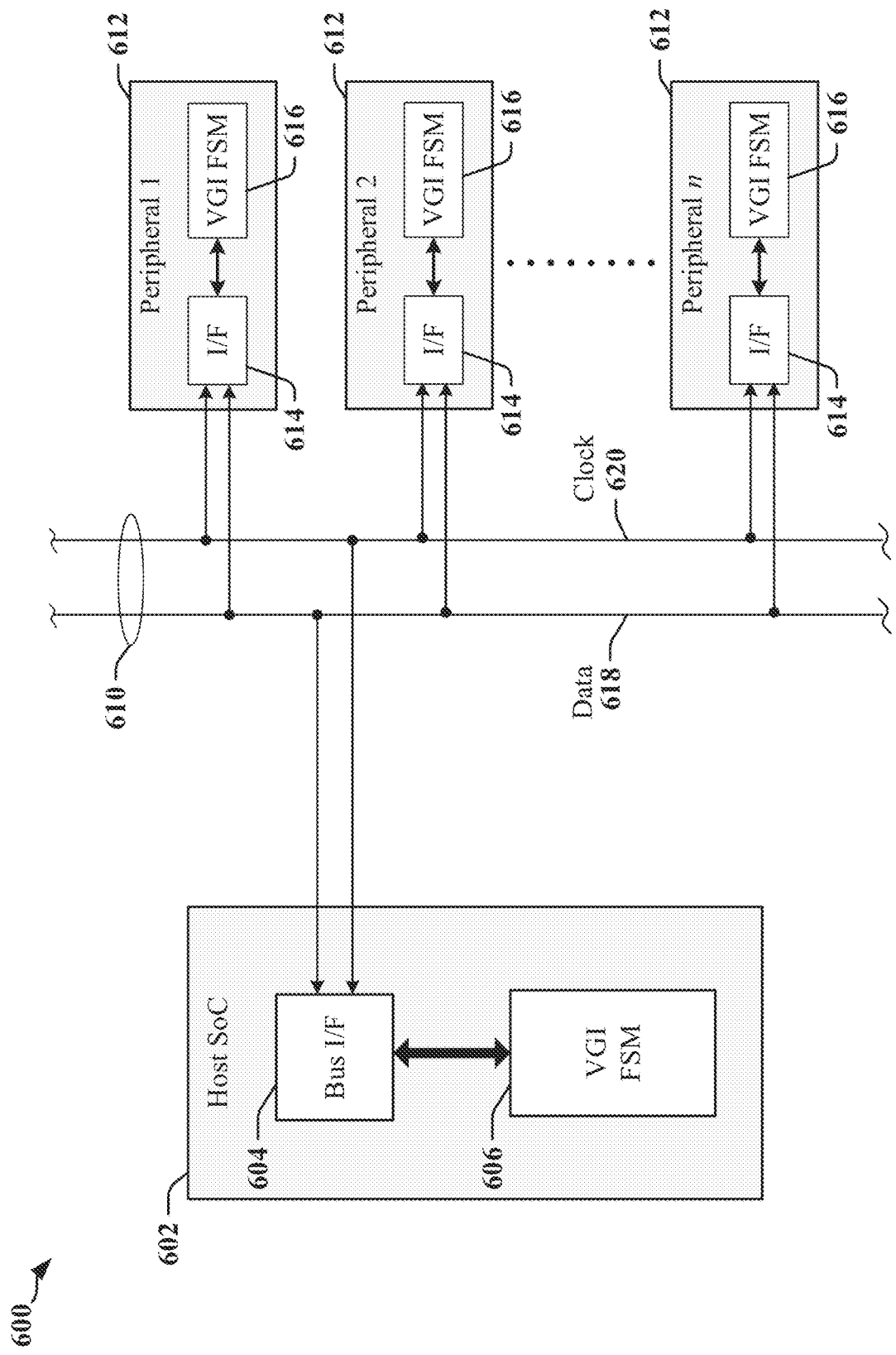
FIG. 6 illustrates an apparatus that uses multi-drop, serial bus to couple various devices in accordance with certain aspects disclosed herein.

FIG. 6 illustrates an example of an apparatus 600 that uses a multi-drop serial bus 610 to couple various devices including a host SoC 602 and a number of peripheral devices 612. The host SoC 602 may include a virtual GPIO finite state machine (VGI FSM 606) and a bus interface 604, where the bus interface 604 cooperates with corresponding I3C bus interfaces 614 in one or more peripheral devices 612 to provide a communication link between the host SoC 602 and the peripheral devices 612. Each peripheral device 612 includes a VGI FSM 616. In the illustrated example, messages exchanged between the SoC 602 and a peripheral device 612 may be serialized and transmitted over a multi-drop serial bus 610 in accordance with an RFFE, I2C, I3C, SPMI, or other protocol. In some examples, the host SoC 602 may include or support multiple types of interface, including I2C and/or RFFE interfaces. In other examples, the host SoC 602 may include a configurable interface that may be employed to communicate using I2C, I3C, RFFE and/or another suitable protocol. In various examples, a multi-drop serial bus 610 includes a data wire 618 used to carry a data signal in accordance with timing provided by a clock signal transmitted over a clock wire 620.

Examples of Transmissions on a Multi-Drop Half-Duplex Bus

Figure 7:
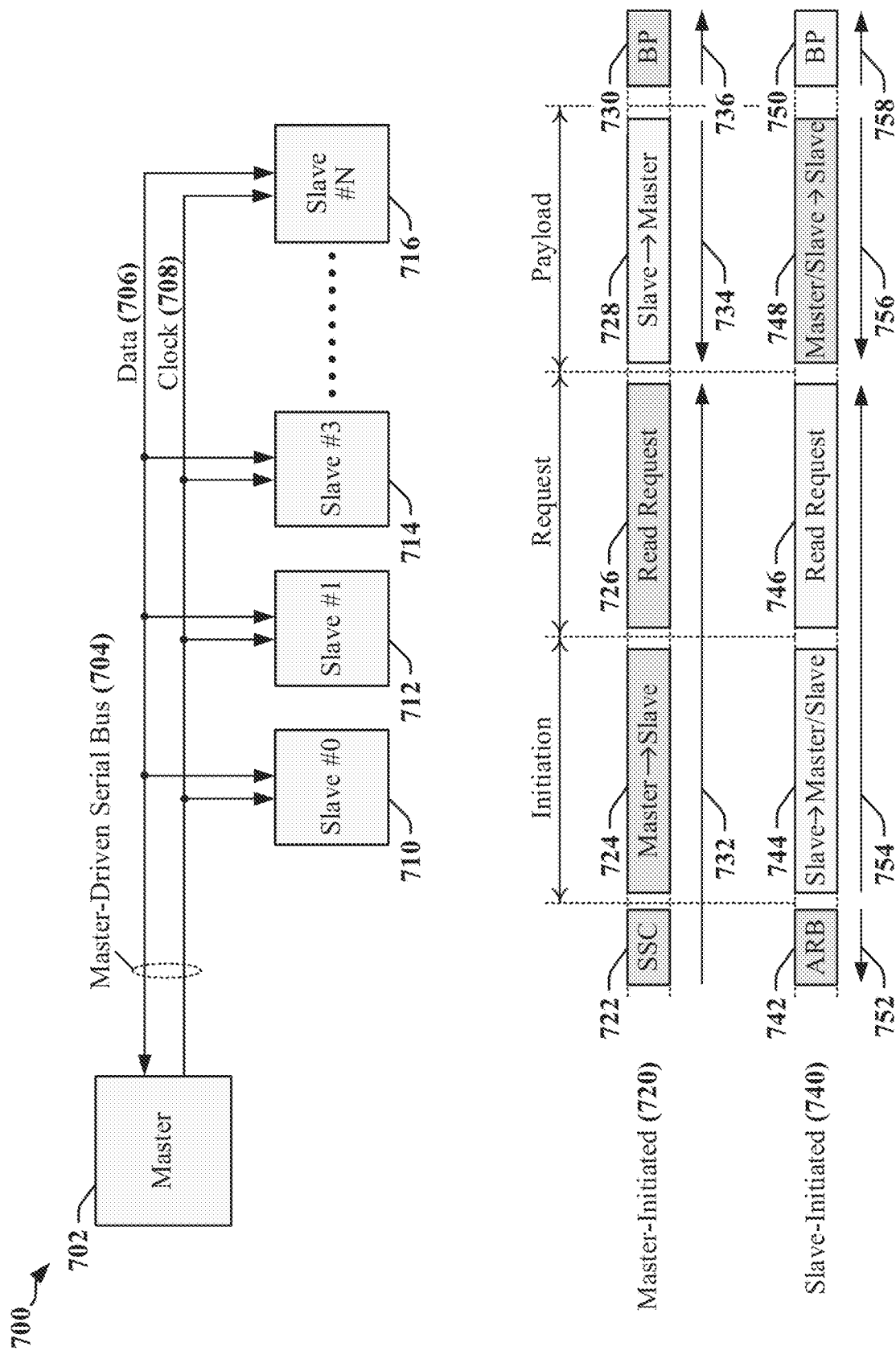
FIG. 7 illustrates a system illustrating operation of a serial bus that couples a master device to multiple slave devices.

FIG. 7 illustrates a system 700 that can engage in conventional multi-drop half-duplex operations when a serial bus 704 couples a master device 702 to multiple slave devices 710, 712, 714, 716. Data may be communicated in a signal that is transmitted over a data line 706 in accordance timing provided by a clock signal transmitted on a clock line 708. Data generated or consumed by an application, virtual GPIO data, command and control data and other information may be encoded or encapsulated in a data payload 728, 748 of datagrams 720, 740 and transmitted over the data line 706. At each stage data flows in a direction that is determined by the type of operation, and is fixed for each datagram. FIG. 7 includes datagrams 720, 740 in which a read is performed, resulting in at least one bus turnaround of the serial bus 704. The clock signal is transmitted by the master device 702 for read and write operations, as well as before and after bus turnarounds. The direction of data flow 732, 734, 736, 752, 754, 756, 758 is illustrated from the perspective of an initiator of a transaction.

A first datagram 720 relates to a master-initiated transaction. The master device 702 drives a sequence start condition (SSC 722) on the data line 706 to initiate the transaction. The master device 702 then transmits information 724 identifying at least the address of a slave device 710, 712, 714, 716 from which data is to be read. In certain implementations, protocols may specify or necessitate that the master device 702 transmit an address of the destination of data read from the identified slave device 710, 712, 714, 716. The master device 702 may then transmit a read request 726 that includes a command code to initiate the read from the identified slave device 710, 712, 714, 716. The direction of data flow 732 for these initial transmissions is from master device 702 to slave device 710, 712, 714, 716. Since a read operation has been initiated, the master device 702 releases the data line 706 to enable the identified slave device 710, 712, 714, 716 to begin transmission of a data payload 728 on the data line 706, typically from register addresses or other locations identified in the read request 726. Following transmission of the data payload 728, the identified slave device 710, 712, 714, 716 releases the data line 706 and the master device 702 may transmit additional commands or a bus park sequence (BP 730) to terminate the transaction. The direction of data flow 732, 734, 736 on the data line 706 depends on which device 702, 710, 712, 714, 716 is driving the data line 706. Line drivers of devices 702, 710, 712, 714, 716 that are not driving the data line 706 are typically placed in a high impedance state.

A second datagram 740 relates to a slave-initiated transaction. A slave device 710, 712, 714, 716 may participate in bus arbitration 742 to gain control of the serial bus 704 in order to conduct a transaction with the master device 702 and/or another slave device 710, 712, 714, 716. The winning slave device 710, 712, 714, 716 may then transmit information 744 identifying at least the address of a device 702, 710, 712, 714, 716 from which data is to be read. In certain implementations, protocol may necessitate that the winning slave device 710, 712, 714, 716 transmit an address of the destination of data read from the identified device 702, 710, 712, 714, 716 from which data is to be read. The winning slave device 710, 712, 714, 716 may then transmit a read request 746 that includes a command code to initiate the read from the identified device 702, 710, 712, 714, 716 from which data is to be read. Since a read operation has been initiated, the winning slave device 710, 712, 714, 716 releases the data line 706 to enable the identified device 702, 710, 712, 714, 716 from which data is to be read to begin transmission of a data payload 748 on the data line 706, typically from register addresses or other locations identified in the read request 746. Following transmission of the data payload 748, the identified device 702, 710, 712, 714, 716 from which data is to be read releases the data line 706 and a BP 750 may be transmitted to terminate the transaction. The direction of data flow 752, 754, 756 on the data line 706 depends on which device 702, 710, 712, 714, 716 is driving the data line 706. Line drivers of devices 702, 710, 712, 714, 716 that are not driving the data line 706 are typically placed in a high impedance state.

Staggered Transmissions on a Multi-Drop Half Duplex Bus

According to certain aspects disclosed herein, effective throughput enhancements may be achieved for a serial bus when actively-paired devices can exchange data in both directions during a single transaction. In some instances, data is exchanged in both directions during transmission of a datagram by one of the actively-paired devices. Transmissions may be staggered throughout the datagram and/or at configured times in the datagram transmission. The direction of data transfer may be controlled in accordance with a configuration defined for the actively-paired devices, a command code used to initiate the transaction, a type of the datagram, and/or as negotiated between the actively-paired devices.

Figure 8:
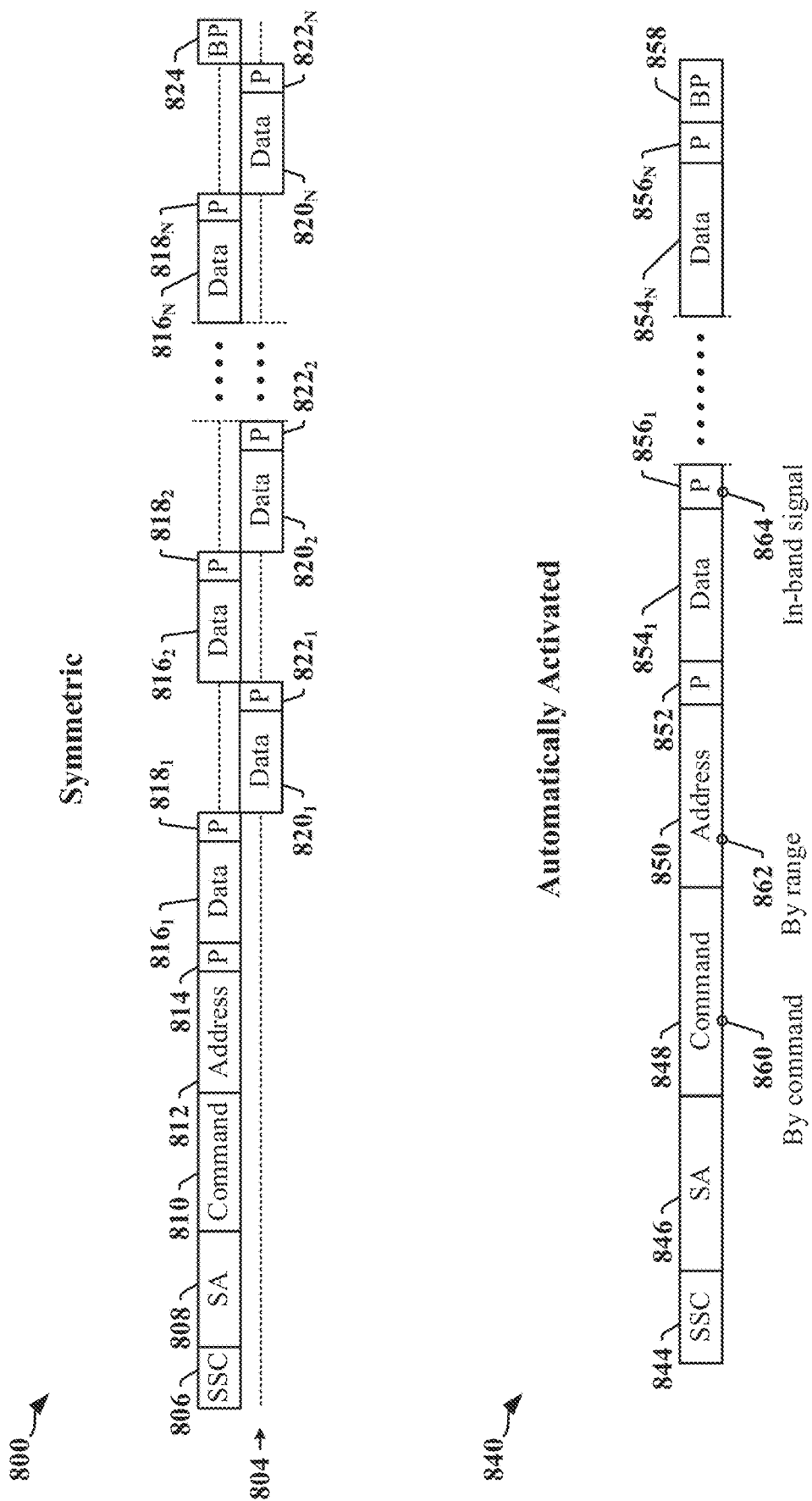
FIG. 8 illustrates the use of datagrams to facilitate staggered bi-directional transmission over a serial bus in accordance with certain aspects disclosed herein.

FIG. 8 illustrates transactions and/or datagrams 800, 840 that can facilitate staggered bi-directional transmission over a serial bus in accordance with certain aspects disclosed herein. The transactions and/or datagrams 800, 840 may be transmitted in accordance with an RFFE, SPMI, I3C or other protocol, and certain commands, addresses and control data or signals may be conformed to the requirements of the protocol used to operate the serial bus. For example, transmission of the illustrated transactions and/or datagrams 800, 840 is initiated when a bus master transmits a sequence start condition (SSC 806, 844) and is terminated when the bus master transmits a bus park sequence (BP 824, 858). In other examples, which are not depicted in FIG. 8, a transaction may be initiated by a slave device through interrupt and/or bus arbitration processes defined by protocol. The method by which a BP 824, 858 or SSC 806, 844 is signaled may be determined by the protocol used to control the serial bus, and certain control data or signals, such as acknowledgement signaling, may be supported by some protocols and omitted by others. The differences between protocols and the form of initiation of a transaction or datagram does not adversely affect the implementation of the concepts disclosed herein, which are described in reference to examples selected merely to facilitate description, and which do not limit the scope of the disclosed features or the types of bus or protocol that can benefit from implementation of the concepts disclosed herein.

A first transaction or datagram 800 may be employed in a symmetric mode of staggered transmission, where clock-cycles are divided by configuration between both directions of transmission. The master and slave devices take turns transmitting on the serial bus. The initiation of the first transaction or datagram 800 establishes an active pairing of two devices that can then exchange data in each direction over a given number of clock-cycles. In some instances, transmission time is allocated evenly between the actively-paired devices, including when the actively-paired devices include master and slave devices. In other instances, transmission time is allocated according to application needs and/or through negotiation. In one example, a first actively-paired device transmits a byte of data (with or without parity) to the second actively-paired device, and then releases the serial bus for a number of clock cycles in order to permit the second actively-paired device to transmit a byte of data. In another example, the first actively-paired device transmits an agreed number of bits of data to the second actively-paired device, and then releases the serial bus for a number of clock cycles in order to permit the second actively-paired device to transmit the agreed number of bits of data. In another example, the first actively-paired device transmits an agreed number of bytes or words to the second actively-paired device, and then releases the serial bus for a number of clock cycles in order to permit the second actively-paired device to transmit the agreed number of bytes or words. In some examples, the receiver of data may reconstruct a control, command and/or payload data from the received staggered transmission.

In the illustrated example, the first actively-paired device may be a master device that initiates a transaction or datagram 800 in order to transmit a specific type or size of data in a first direction, and the second actively-paired device may be a slave device. The slave device may use the available transmission opportunities to transmit data to the master device in the reverse direction. The slave device may transmit data that is unrelated to the data received from the master device.

In the illustrated example, the master device initiates a transaction or datagram 800 by transmitting the SSC 806. The master device may transmit a slave address 808 to identify the slave device to receive data payloads transmitted by the master device. In some instances, the master device and the slave device are considered to be actively-paired after the slave address 808 has been transmitted. In some examples, the devices may be actively paired when each of the master and slave devices have been configured to support staggered transmissions and to recognize the other device as being capable of handling staggered transmissions.

The master device may transmit a command code in a command field 810, where the command code specifies the type of operation to be performed. The master device may specify a write operation (as illustrated in FIG. 8) or a read operation. The master device may transmit address information 812 indicating the starting location for a register write or read. The address information 812 may include, or have appended, an error detection and/or error correction field, which may include a parity bit 814, cyclic redundancy check (CRC) values, a checksum, or the like. Data fields $816_1$-$816_N$ and $820_1$-$820_N$ may then be transmitted followed by parity $818_1$-$818_N$ and $822_1$-$822_N$, respectively.

The master device may transmit a command code in the command field 810 specifying the operation to be performed in the forward direction. The operation may be a read or write operation, for example. The master device may transmit a register address in the address information 812, the register address identifying a start location for the read or write operation specified by the command code in the command field 810. The master device may transmit first when a write operation is specified, and the master device may receive first when a read operation is specified, although the order of transmission and/or reception may be defined by configuration and/or for each transaction or type of transaction.

A slave device may initiate a reverse transaction independently of the transaction initiated by the master device. In the example illustrated in FIG. 8, the master device may transmit a read command in the command field 810 with address information 812 that specifies a first register to be read. The slave device may transmit command and address information in one or more data fields $820_1$-$820_N$ transmitted in the reverse direction.

In some instances, the reverse direction data fields $820_1$-$820_N$ may be unused or partially used. In these instances, bandwidth utilization and/or latencies may be sub-optimal, although the use of symmetric staggering may improve bandwidth utilization and/or latency over conventional half-duplex operation. Symmetric staggering may provide improved bandwidth utilization and/or reduced latency on the aggregate over conventional half-duplex operation.

A second transaction or datagram 840 illustrates signaling 860, 862, 864 that activates reverse data transmissions between actively-paired devices that are configured for staggered transmissions. In the illustrated example, the master device initiates the transaction or datagram 840 by transmitting the SSC 844. The master device may transmit a slave address 846 to identify the slave device to receive data payloads transmitted by the master device. In some instances, the master device and the slave device are considered to be actively-paired after the slave address 846 has been transmitted. In some examples, the devices may be actively paired when each of the master and slave devices have been configured to support staggered transmissions and to recognize the other device as being capable of handling staggered transmissions.

The master device may transmit a command code in a command field 848, where the command code specifies the type of operation to be performed. The master device may specify a write operation (as illustrated in FIG. 8) or a read operation. The master device may transmit address information 850 indicating the starting location for a register write or read. The address information 850 may include, or have appended, an error detection and/or error correction field, which may include a parity bit 852, cyclic redundancy check (CRC) values, a checksum, or the like. Data fields $854_1$-$854_N$ may then be transmitted followed by parity $856_1$-$856_N$.

According to certain aspects disclosed herein, reverse direction transmissions may be automatically initiated between actively-paired devices that are configured for staggered transmissions responsive to signaling 860, 862, 864 by one or both devices. In one example, signaling 860 is provided in the command field 848. Staggered transmissions may be enabled when certain command codes are included in the command field 848. Command codes that enable staggered communication may be identified in configuration information maintained by both devices and/or may be provided by applications.

In another example, staggered transmissions may be enabled by signaling 862 when the address information 850 identifies a register that has an address that matches an address or range of addresses associated with staggered transmissions in configuration information. Addresses and/or address ranges that enable staggered communication may be identified in configuration information maintained by both devices and/or may be provided by an application.

In another example, a device may indicate a desire to transmit data in the reverse direction using in-band signaling 864 transmitted on the clock signal during parity bit transmissions. The in-band signaling 864 may be used to enable (or disable) staggered transmissions at a byte boundary. In-band signaling 864 can be used to provide reverse direction slots when data is available for transmission at a receiving device. In some implementations, in-band signaling 864 can be used to initiate reverse-direction traffic transmission without need to define an enabling forward-direction command or identified register address range for actively-paired devices that have been configured to support staggered transmission. In some implementations, in-band signaling 864 can be used to provide reverse direction slots when data is available for transmission and after transmission of an enabling forward-direction command and/or identified register address range.

Figure 9:
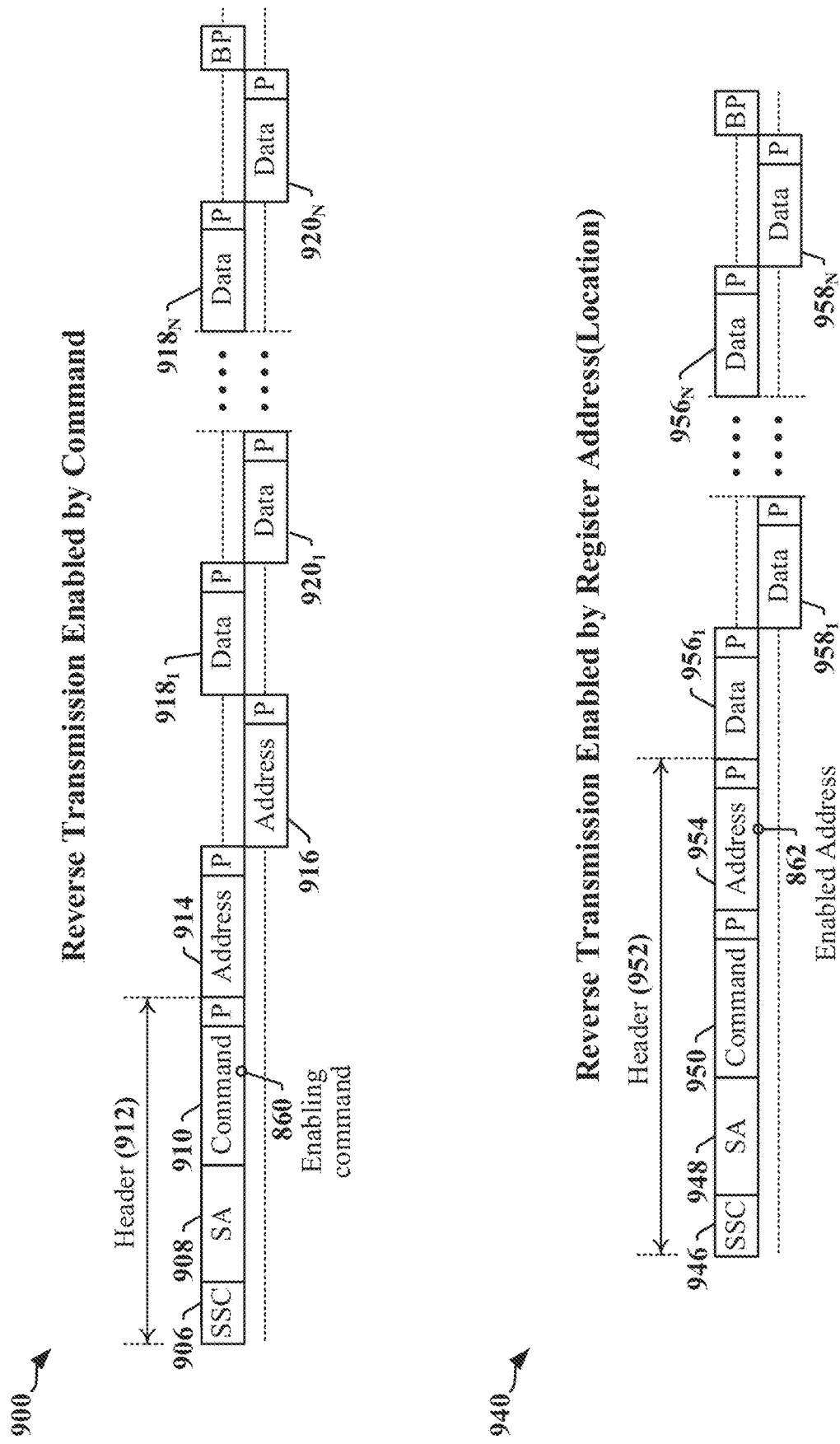
FIG. 9 includes datagrams that illustrate first and second examples in which staggered transmissions may be enabled or initiated in accordance with certain aspects disclosed herein.

In FIG. 9, a first datagram 900 illustrates a first example in which staggered transmissions are enabled or initiated between actively-paired devices coupled through a serial bus that is operated in accordance with an RFFE protocol. In this example, staggered transmissions are enabled or initiated by certain commands transmitted by a master device. Command codes that enable or initiate staggered transmissions may be identified in configuration information maintained by the actively-paired devices. In other examples, the serial bus may be operated in accordance with an SPMI, I3C or other protocol, and the staggered transmissions may be enabled or initiated by similarly transmitted commands and/or by commands that have a different format or structure.

In the first example, the master device initiates a transaction or datagram 900 by transmitting an SSC 906. The master device may transmit a slave address 908 to identify the slave device that is to receive data payloads transmitted by the master device. In some instances, the master device and the slave device are considered to be actively-paired after the slave address 908 has been transmitted. Each of the master and slave devices may have been configured to support staggered transmissions and to recognize the other device as being capable of handling staggered transmissions during initialization or by configuration by an application.

The master device may transmit a command code in a command field 910, where the command code specifies the type of operation to be performed. The command field 910 may specify a write operation or a read operation, followed by address information 914 indicating the starting location for a register write or read. The command field 910 and/or address information 914 may include, or have appended, an error detection and/or error correction field, which may include a parity bit, cyclic redundancy check (CRC) values, a checksum, or the like. Data fields $918_1$-$918_N$ and $920_1$-$920_N$ may then be transmitted. The reverse data fields $920_1$-$920_N$ may be preceded in transmission by an address field 916 identifying the first register address to be written by data included in the reverse data fields $920_1$-$920_N$.

In some instances, the actively-paired devices may recognize the content of the command field 910 as being associated with staggered transmissions. For example, configuration information may determine that a command code included in the command field 910 indicates that the actively-paired devices can use byte-level staggered transmissions. The command frame may also indicate the number of bytes that can be exchanged between the actively-paired devices. The number of bytes may relate to the forward direction traffic, reverse direction traffic, or combined traffic.

Data may be transmitted in both directions within a single transaction without repetition of a header 912, where the header 912 may include the SSC 906, the slave address 908, the command field 910 and/or one or more parity bits. The use of staggered transmissions enables reverse data fields $920_1$-$920_N$ to be exchanged in the same datagram 900 as forward data fields $918_1$-$918_N$, and eliminates bus arbitration and/or certain header transmissions that would otherwise precede transmission of the reverse data fields $920_1$-$920_N$. The elimination of transmissions can reduce bus latency. In one example, the bus may be clocked at 26 MHz and the header is transmitted in 15 clock cycles, providing a header time of:

$$15 \times 38.5 \text{ ns} = 0.57 \text{ μs}.$$

Accordingly, the latency reduction associated with reverse data exchanged in staggered transmission is at least 0.57 μs at 26 MHz on an RFFE or SPMI bus.

In FIG. 9, a second datagram 940 illustrates a second example in which staggered transmissions are enabled or initiated between actively-paired devices coupled through a serial bus that is operated in accordance with an RFFE protocol. In this example, staggered transmissions are enabled or initiated when registers in certain address ranges are addressed. Address ranges in which staggered transmissions are enabled may be identified in configuration information maintained by the actively-paired devices. In other examples, the serial bus may be operated in accordance with an SPMI, I3C or other protocol, and the staggered transmissions may be similarly enabled or initiated based on register address ranges.

In the second example, the master device initiates a transaction or datagram 940 by transmitting an SSC 946. The master device may transmit a slave address 948 to identify the slave device that is to receive data payloads transmitted by the master device. In some instances, the master device and the slave device are considered to be actively-paired after the slave address 948 has been transmitted. Each of the master and slave devices may have been configured to support staggered transmissions and to recognize the other device as being capable of handling staggered transmissions during initialization or by configuration by an application.

The master device may transmit a command code in a command field 950, where the command code specifies the type of operation to be performed. The command field 950 may include a command code that specifies a write operation or a read operation, followed by address information 954 indicating the starting location for a register write or read. The command field 950 and/or address information 954 may include, or have appended, an error detection and/or error correction field, which may include a parity bit, cyclic redundancy check (CRC) values, a checksum, or the like. Data fields $956_1$-$956_N$ and $958_1$-$958_N$ may then be transmitted.

In some instances, the actively-paired devices may recognize the address transmitted in the address information 954 as lying within a range of addresses for which staggered transmissions are enabled. In this example, the paired devices know what addresses should receive write-back data.

Data may be transmitted in both directions within a single transaction without repetition of a header 952, where the header 952 may include the SSC 946, the slave address 948, the command field 950, the address information 954 and/or one or more parity bits. The use of staggered transmissions enables reverse data fields $958_1$-$958_N$ to be exchanged in the same datagram 940 as forward data fields $956_1$-$956_N$, and eliminates the bus arbitration and/or certain header transmissions that would otherwise precede transmission of the reverse data fields $958_1$-$958_N$. The elimination of such transmissions can reduce bus latency. In one example, the bus may be clocked at 26 MHz and the header is transmitted in 24 clock cycles, providing a header time of:

24×38.5 ns=0.92 μs.

Accordingly, the latency reduction associated with reverse data exchanged in staggered transmission is at least 0.92 μs at 26 MHz on an RFFE or SPMI bus.

Figure 10:
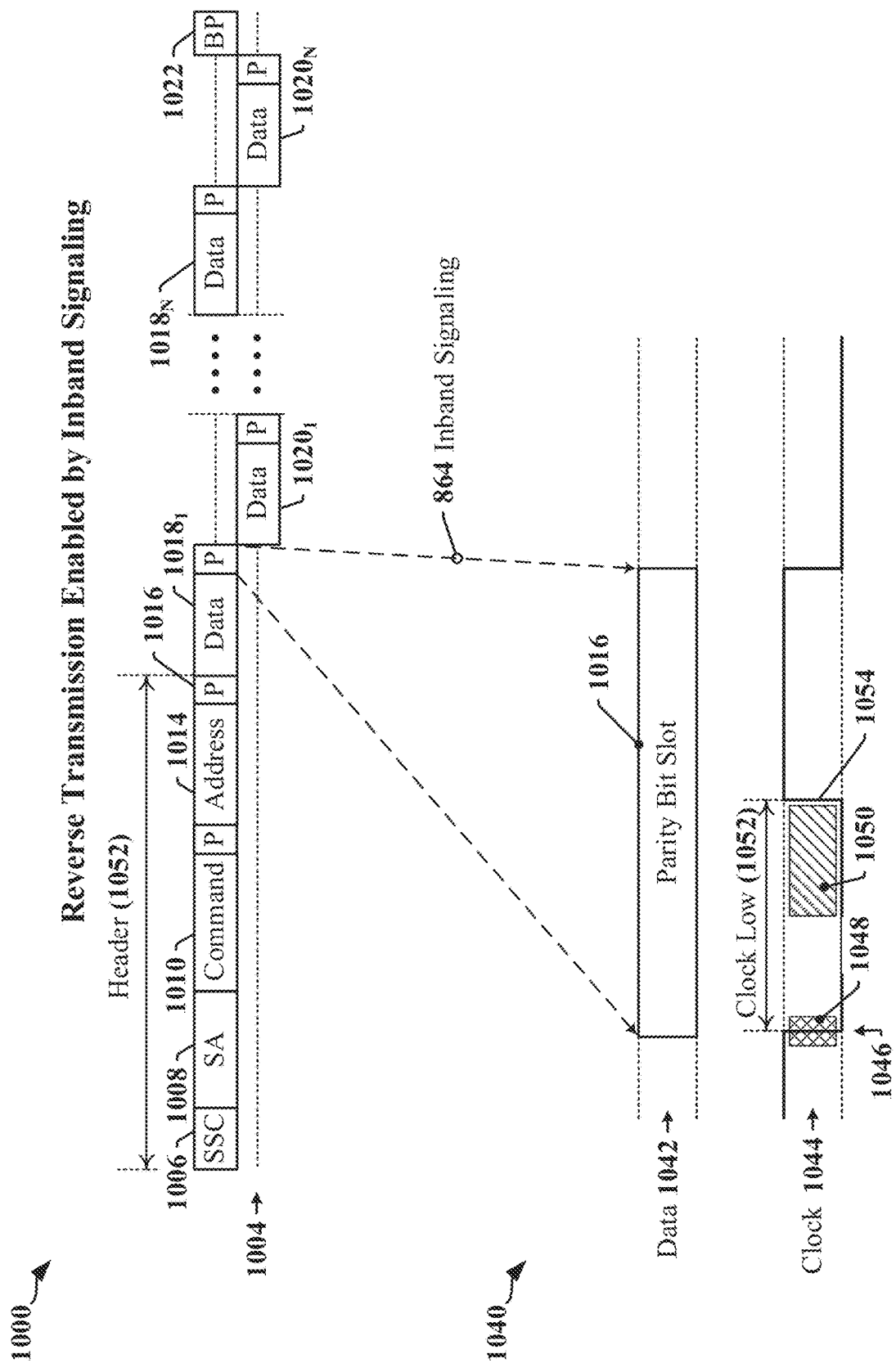
FIG. 10 illustrates a third example in which staggered transmissions may be enabled or initiated in accordance with certain aspects disclosed herein.

In FIG. 10, a datagram 1000 illustrates a third example in which staggered transmissions can be enabled or initiated between actively-paired devices coupled through a serial bus that is operated in accordance with an RFFE protocol. Staggered transmissions may be enabled or initiated by in-band signaling 864 generated by the device that intends or desires transmission of reverse data. In one example, the in-band signaling 864 may be transmitted on a clock signal transmitted on the clock line 1044 during a bit slot 1016 designated for transmission of a parity bit on the data line 1042. In other examples, the serial bus may be operated in accordance with an SPMI, I3C or other protocol and the staggered transmissions may be enabled or initiated by in-band signaling transmitted in slots designated for transmission of parity, acknowledge (ACK) or other command or control information.

The master device may initiate the datagram 1000 by transmitting an SSC 1006. The master device may transmit a slave address 1008 to identify the slave device that is to receive data payloads transmitted by the master device. In some instances, the master device and the slave device are considered to be actively-paired after the slave address 1008 has been transmitted. Each of the master and slave devices may have been configured to support staggered transmissions and to recognize the other device as being capable of handling staggered transmissions during initialization or by configuration by an application.

The master device may transmit a command code in a command field 1010, where the command code specifies the type of operation to be performed. The command code may specify a write operation or a read operation, followed by address information 1014 indicating the starting location for a register write or read. The command field 1010 and/or address information 1014 may include, or have appended, an error detection and/or error correction field, which may include a parity bit, cyclic redundancy check (CRC) values, a checksum, or the like. Data fields $1018_1$-$1018_N$ and $1020_1$-$1020_N$ may then be transmitted.

Transmission of write-back data as a staggered transmission may be initiated by in-band signaling 864 that indicates that a byte of write-back data is to be transmitted in a data field $1020_1$-$1020_N$ after completion of a bit slot 1016 designated for transmission of a parity bit. In one example, the master device may be transmitting data in a data field $1018_1$ when the in-band signaling 864 is asserted, causing the master device to yield the data line to enable a byte of write-back to be transmitted. The master device may yield the data line by causing a line driver to enter a high impedance state for the duration of the write-back transmission.

In one example, the master device may drive a falling edge 1046 in the clock signal transmitted on the clock line 1044 to start the bit slot 1016 used to transmit the parity bit. The master device may then release the clock line 1044 by causing a line driver coupled to the clock line 1044 to leave an active driving state 1048 and enter a high-impedance state, with the clock line 1044 being held in the low state by a keeper circuit, pull-down resistor, or the like. According to certain aspects disclosed herein, the slave device may drive the clock line 1044 during an interval 1050 within the second half of the expected low duration 1052 of the clock signal. The slave device may signal an intention to transmit a byte of write-back data in a data field $1020_1$ by driving the clock line 1044 high before the expected transition 1054 that would otherwise be driven by the master device. The slave device may release the clock line 1044 to enable the master device to resume driving the clock signal. The master device may determine that the clock line 1044 has been driven high early, and may determine that a reverse transmission is to be performed.

In another example, an interval for in-band signaling may be provided during the high-period of the clock signal. The master device may drive a rising edge in the clock signal transmitted on the clock line 1044 during the bit slot 1016 used to transmit the parity bit, before releasing the clock line 1044. The master device may release the clock line 1044 by causing a line driver coupled to the clock line 1044 to leave an active driving state 1048 and enter a high-impedance state, with the clock line 1044 being held in the high state by a keeper circuit, pull-down impedance, or the like. The slave device may signal an intention to transmit a byte of writeback data in a data field $1020_1$ by driving the clock line 1044 low before the expected low transition that would otherwise be driven by the master device. The slave device may release the clock line 1044 to enable the master device to resume driving the clock signal. The master device may determine that the clock line 1044 has been driven low early, and may determine that a reverse transmission is to be performed.

The use of in-band signaling permits data to be transmitted in both directions within a single transaction without repetition of bus arbitration and/or certain header transmissions. The use of staggered transmissions enables reverse data fields $1020_1$-$1020_N$ to be exchanged in the same datagram 1000 as forward data fields $1018_1$-$1018_N$, and eliminates the bus arbitration and/or certain header transmissions that would otherwise precede transmission of the reverse data fields $1020_1$-$1020_N$. The elimination of such transmissions can reduce bus latency. As disclosed herein, the latency reduction associated with reverse data exchanged in staggered transmission is at least 0.57 µs at 26 MHz on an RFFE or SPMI bus.

In some implementations, the number of reverse data fields $1020_1$-$1020_N$ initiated of in-band signaling may be limited to prevent bus hogging, where a single device can lock out other devices by continuous demand for reverse transmissions. In one example, a maximum number of reverse data fields $1020_1$-$1020_N$ may be configured. In one example, a maximum number of reverse data fields $1020_1$-$1020_N$ per datagram may be configured. In another example, a maximum number of combined forward data fields $1018_1$-$1018_N$ and reverse data fields $1020_1$-$1020_N$ per datagram may be configured.

In certain implementations, one or more of the in-band signaling events may be employed to initiate the reverse direction transmission. The use of more than one in-band signaling event may safeguard against an error occurring during a single parity bit cycle. In some examples, the configuration of in-band signaling used may be determined or provided by application, during system initialization, manufacture or by a bus master device.

Examples of Processing Circuits and Methods

Figure 11:
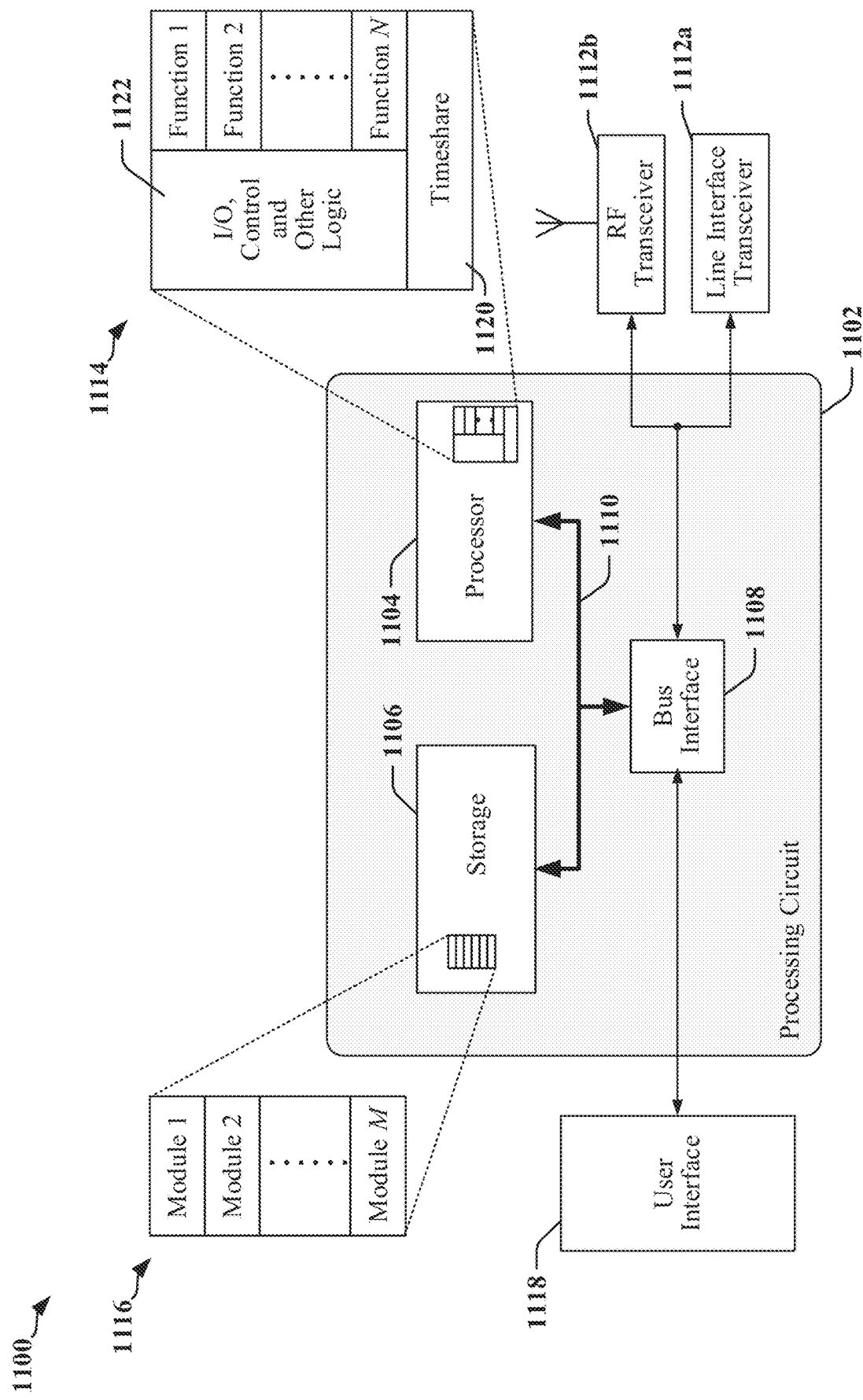
FIG. 11 illustrates one example of an apparatus employing a processing circuit that may be adapted according to certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as a transceiver 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to a transceiver 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, a transceiver 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 12:
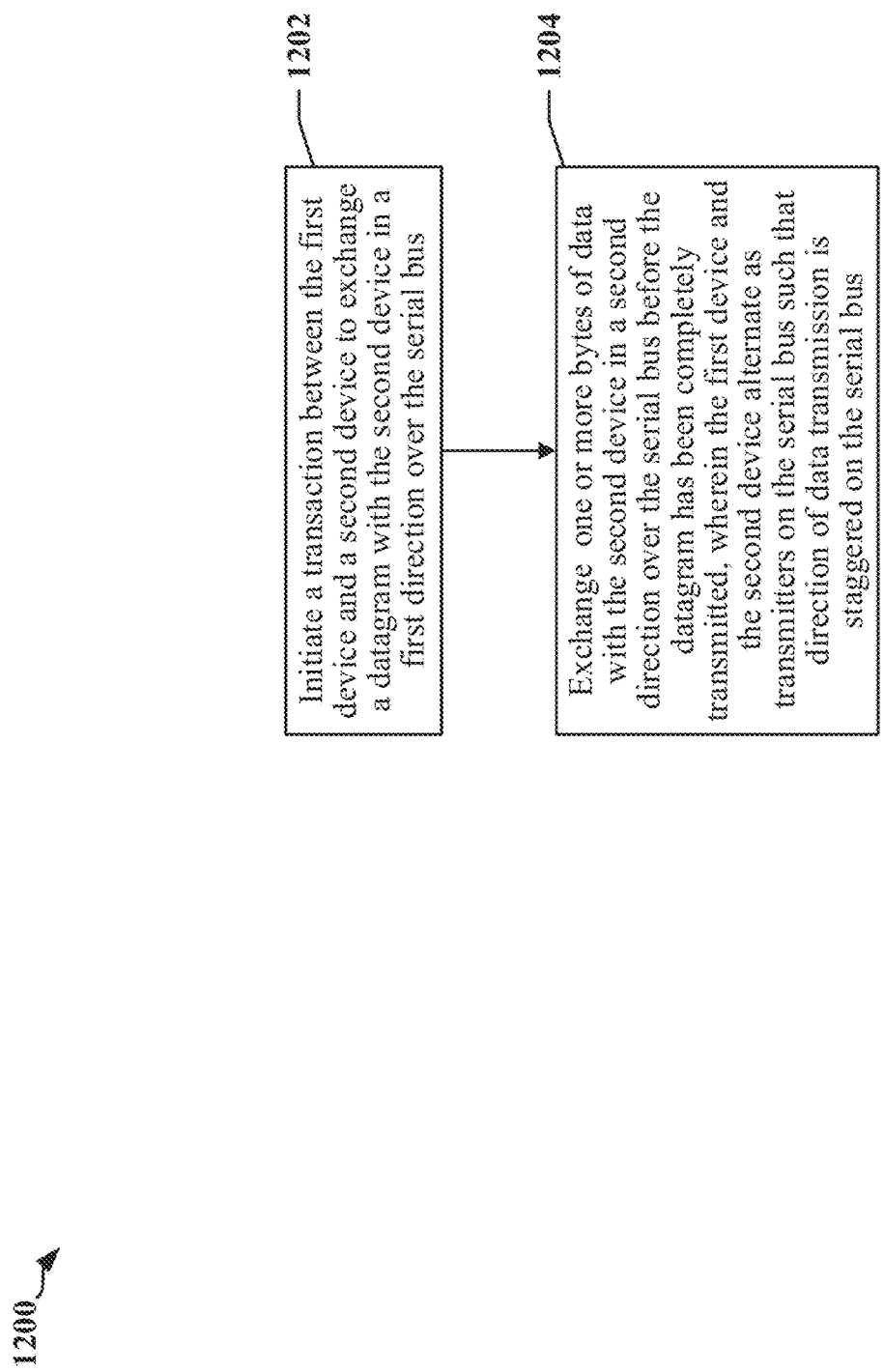
FIG. 12 is a flowchart that illustrates certain aspects disclosed herein.

FIG. 12 is a flowchart 1200 of a method that may be performed by a device coupled to a serial bus. The serial bus may be operated in accordance with an I3C, RFFE, SPMI or other protocol. At block 1202, the device may initiate a transaction between the first device and a second device to exchange a datagram with the second device in a first direction over the serial bus. At block 1204, the device may exchange one or more bytes of data with the second device in a second direction over the serial bus before the datagram has been completely transmitted. The first device and the second device may alternate as transmitters on the serial bus such that direction of data transmission is staggered on the serial bus.

In certain examples, initiating the transaction between the first device and the second device includes transmitting a device address from the first device on the serial bus, the device address identifying the second device, and transmitting a command from the first device to the second device over the serial bus to identify a type of exchange to be executed in the first direction over the serial bus. In a first example, initiating the transaction between the first device and the second device may include transmitting an SSC on the serial bus before transmitting the device address. In a second example, initiating the transaction between the first device and the second device includes participating in bus arbitration as a slave device to obtain access to the serial bus before transmitting the device address. The first device and the second device may be considered to be actively bound after the device address is received by the second device.

In some examples, a clock signal is transmitted on a clock line of the serial bus. The first device and the second device may be adapted to configure a first line driver to operate as a transmitter on a data line of the serial bus for a first number cycles of the clock signal sufficient to transmit one byte of data, and reconfigure the first line driver to operate as a receiver on the serial bus after the first number cycles of the clock signal have been completed. The direction of data transmission may be staggered on the serial bus until the one or more bytes of data have been exchanged.

In one example, the command includes a command code selected from a plurality of available command codes. The first device and the second device may be configured to stagger the direction of data transmission in response to one or more of the plurality of available command codes.

In one example, initiating the transaction between the two devices includes transmitting a register address from the first device on the serial bus after transmitting the command. The first device and the second device may be configured to stagger the direction of data transmission when the register address falls within a range of addresses preconfigured for staggered transmissions.

In one example, the first device may cause an early transition in signaling state in the clock signal while a parity bit is transmitted in the first direction on the data line of the serial bus. The early transition may cause transmission of data in the first direction to be suspended. The first device may transmit a byte of data in the second direction after the parity bit has been transmitted in the first direction. The early transition in signaling state may be a transition from a low voltage state to a high voltage state, or a transition from a high voltage state to a low voltage state.

In one example, the first device may determine that an early transition in signaling state in the clock signal has occurred while transmitting a parity bit in the first direction on the data line of the serial bus, suspend transmission of data in the first direction in response to the early transition, and receive a byte of data transmitted in the second direction after completing transmission of the parity bit in the first direction.

Figure 13:
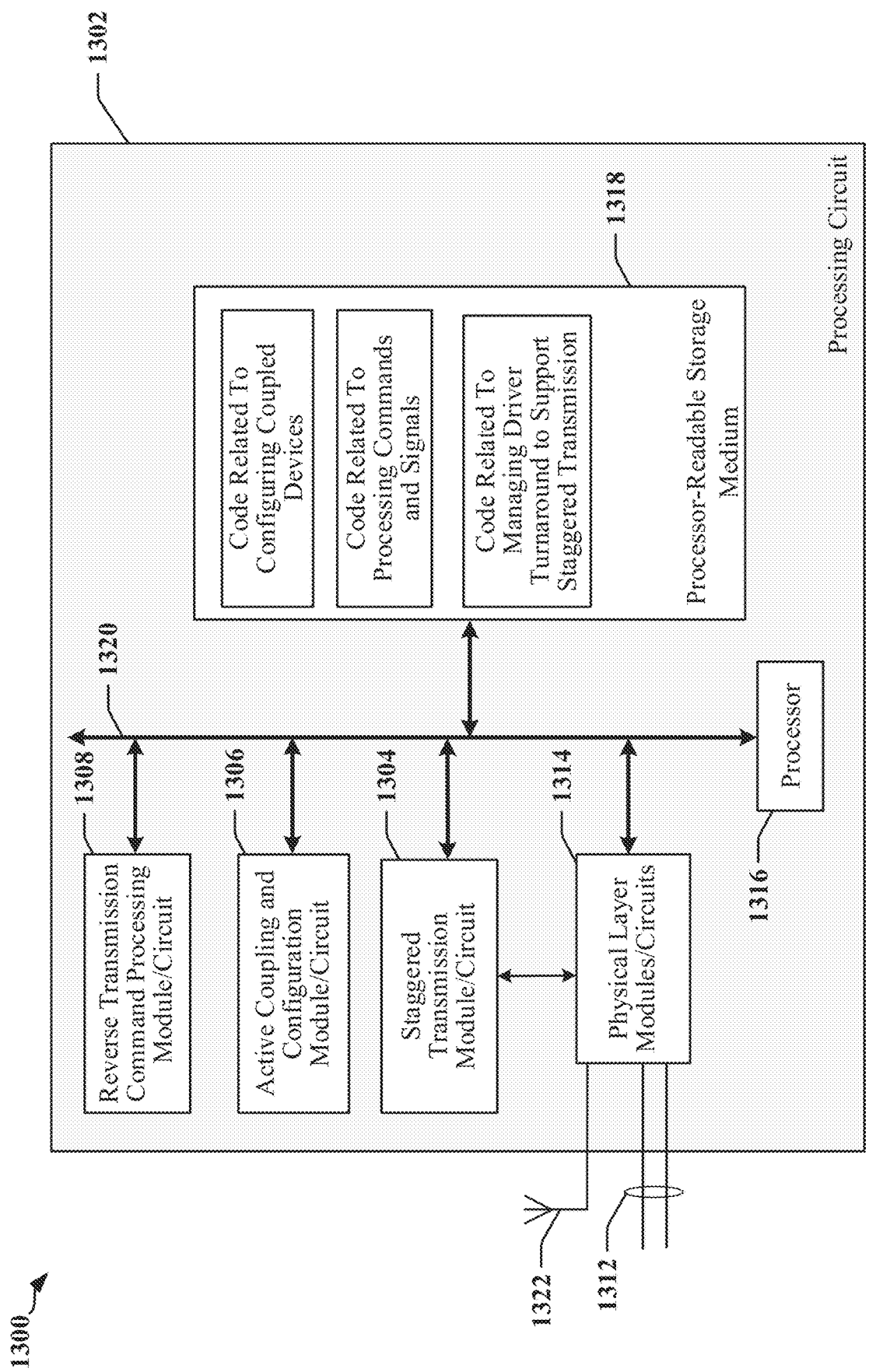
FIG. 13 illustrates an example of a hardware implementation for an apparatus adapted in accordance with certain aspects disclosed herein.

FIG. 13 is a diagram illustrating a simplified example of a hardware implementation for an apparatus 1300 employing a processing circuit 1302. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308, and the processor-readable storage medium 1318. One or more physical layer circuits and/or modules 1314 may be provided to support communications over a communication link implemented using a multi-drop serial bus 1312, through an antenna 1322 (to a radio access network for example), and so on. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The processor-readable storage medium may include a non-transitory storage medium. The software, when executed by the processor 1316, causes the processing circuit 1302 to perform the various functions described supra for any particular apparatus. The processor-readable storage medium may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 adapted to receive and process commands, register addresses and/or in-band signaling to determine when staggered transmission is indicated, modules and/or circuits 1306 adapted to configure actively coupled devices based on staggered transmission capabilities, and modules and/or circuits 1304 adapted to manage staggered transmission and/or configure or control the one or more physical layer circuits and/or modules 1314 during staggered transmission.

In one example, the apparatus 1300 may have an interface circuit adapted to couple the apparatus to the multi-drop serial bus 1312, and a processor 1316. The apparatus may be designated as a first device in a plurality of devices coupled to the multi-drop serial bus 1312. The processor 1316 may be configured to initiate a transaction between the first device and a second device to exchange a datagram with the second device in a first direction over the multi-drop serial bus 1312, and exchange one or more bytes of data with the second device in a second direction over the multi-drop serial bus 1312 before the datagram has been completely transmitted. The first device and the second device alternate as transmitters on the multi-drop serial bus 1312 such that direction of data transmission is staggered on the multi-drop serial bus 1312. The multi-drop serial bus 1312 may be operated in accordance with RFFE or SPMI protocols.

In various examples, the processor 1316 is further configured to transmit a device address from the first device on the multi-drop serial bus 1312, the device address identifying the second device, and transmit a command from the first device to the second device over the multi-drop serial bus 1312 to identify a type of exchange to be executed in the first direction over the multi-drop serial bus 1312. The processor 1316 may be further configured to transmit an SSC on the multi-drop serial bus 1312 before transmitting the device address. The processor 1316 may be further configured to participate in bus arbitration as a slave device to obtain access to the multi-drop serial bus 1312 before transmitting the device address. The first device and the second device may be actively bound after the device address is received by the second device. Each of the first device and the second device may be adapted to configure a first line driver to operate as a transmitter on a data line of the multi-drop serial bus 1312 for a first number cycles of clock signal is transmitted on a clock line of the multi-drop serial bus 1312 sufficient to transmit one byte of data, and reconfigure the first line driver to operate as a receiver on the multi-drop serial bus 1312 after the first number cycles of the clock signal have been completed. The direction of data transmission is staggered on the multi-drop serial bus 1312 until the one or more bytes of data have been exchanged. The command may include a command code selected from a plurality of available command codes, where the first device and the second device are configured to stagger the direction of data transmission in response to one or more of the plurality of available command codes. The processor 1316 may be further configured to transmit a register address from the first device on the multi-drop serial bus 1312 after transmitting the command, where the first device and the second device are configured to stagger the direction of data transmission when the register address falls within a range of addresses preconfigured for staggered transmissions. The processor 1316 may be further configured to cause an early transition in signaling state in the clock signal while a parity bit is transmitted in the first direction on the data line of the multi-drop serial bus 1312, where the early transition causes transmission of data in the first direction to be suspended, and transmit a byte of data in the second direction after the parity bit has been transmitted in the first direction. The early transition in signaling state may a transition from a low voltage state to a high voltage state or a transition from a high voltage state to a low voltage state. The processor 1316 may be further configured to determine that an early transition in signaling state in the clock signal has occurred while transmitting a parity bit in the first direction on the data line of the multi-drop serial bus 1312, suspend transmission of data in the first direction in response to the early transition, and receive a byte of data transmitted in the second direction after completing transmission of the parity bit in the first direction.

The processor-readable storage medium 1318 may have one or more instructions which, when executed by at least one processor 1316 or state machine of a processing circuit, cause the processing circuit to initiate a transaction between a first device and a second device to exchange a datagram in a first direction over a multi-drop serial bus 1312, and exchange one or more bytes of data in a second direction over the multi-drop serial bus 1312 before the datagram has been completely transmitted. The first device and the second device alternate as transmitters on the multi-drop serial bus 1312 such that direction of data transmission is staggered on the multi-drop serial bus 1312. The multi-drop serial bus 1312 may be operated in accordance with RFFE or SPMI protocols.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as means plus function unless the element is expressly recited using the phrase "means for."

What is claimed is:

1. A method performed at a first device coupled to a serial bus, comprising:
   initiating a transaction between the first device and a second device to exchange a datagram with the second device in a first direction over the serial bus; and
   exchanging one or more bytes of data with the second device in a second direction over the serial bus before the datagram has been completely transmitted, wherein the first device and the second device alternate as transmitters on the serial bus such that direction of data transmission is staggered on the serial bus, wherein a clock signal is transmitted on a clock line of the serial bus, and wherein each of the first device and the second device is adapted to:
   configure a first line driver to operate as a transmitter on a data line of the serial bus for a first number cycles of the clock signal sufficient to transmit one byte of data; and
   reconfigure the first line driver to operate as a receiver on the serial bus after the first number cycles of the clock signal have been completed.

2. The method of claim 1, wherein the serial bus is operated in accordance with a radio frequency front-end (RFFE) protocol or a system power management interface (SPMI) protocol.

3. The method of claim 1, wherein initiating the transaction between the first device and the second device comprises:
   transmitting a device address from the first device on the serial bus, the device address identifying the second device; and
   transmitting a command from the first device to the second device over on the serial bus to identify a type of exchange to be executed in the first direction over the serial bus.

4. The method of claim 1, wherein the direction of data transmission is staggered on the serial bus until each of the one or more bytes of data has been exchanged.

5. The method of claim 1, further comprising:
   causing an early transition in signaling state in the clock signal while a parity bit is transmitted in the first direction on the data line of the serial bus, wherein the early transition causes transmission of data in the first direction to be suspended; and
   transmitting a first byte of data in the second direction after the parity bit has been transmitted in the first direction.

6. The method of claim 1, further comprising:
   determining that an early transition in signaling state in the clock signal has occurred while transmitting a parity bit in the first direction on the data line of the serial bus;
   suspending transmission of data in the first direction in response to the early transition; and
   receiving a second byte of data that is transmitted in the second direction after completing transmission of the parity bit in the first direction.

7. The method of claim 3, wherein initiating the transaction between the first device and the second device comprises:
   transmitting a sequence start condition (SSC) on the serial bus before transmitting the device address.

8. The method of claim 3, wherein initiating the transaction between the first device and the second device comprises:
   participating in bus arbitration as a slave device to obtain access to the serial bus before transmitting the device address.

9. The method of claim 3, wherein the first device and the second device are actively bound after the device address is received by the second device.

10. The method of claim 3, wherein the command includes a command code selected from a plurality of available command codes, and wherein the first device and the second device are configured to stagger the direction of data transmission in response to one or more of the plurality of available command codes.

11. The method of claim 3, wherein initiating the transaction between the first device and the second device comprises:
transmitting a register address from the first device on the serial bus after transmitting the command, wherein the first device and the second device are configured to stagger the direction of data transmission when the register address falls within a range of addresses preconfigured for staggered transmissions.

12. The method of claim 5, wherein the early transition in signaling state is a transition from a low voltage state to a high voltage state.

13. The method of claim 5, wherein the early transition in signaling state is a transition from a high voltage state to a low voltage state.

14. An apparatus comprising a first device adapted for communicating over a serial bus comprising:
an interface circuit adapted to couple the apparatus to the serial bus, wherein a clock signal is transmitted on a clock line of the serial bus; and
a processor configured to:
initiate a transaction between the first device and a second device to exchange a datagram with the second device in a first direction over the serial bus;
exchange one or more bytes of data with the second device in a second direction over the serial bus before the datagram has been completely transmitted;
configure a first line driver of the interface circuit to operate as a transmitter on a data line of the serial bus for a first number cycles of the clock signal sufficient to transmit one byte of data; and
reconfigure the first line driver of the interface circuit to operate as a receiver on the serial bus after the first number cycles of the clock signal have been completed,
wherein the first device and the second device alternate as transmitters on the serial bus such that direction of data transmission is staggered on the serial bus.

15. The apparatus of claim 14, wherein the serial bus is operated in accordance with a radio frequency front-end (RFFE) protocol or a system power management interface (SPMI) protocol.

16. The apparatus of claim 14, wherein the processor is further configured to:
transmit a device address from the first device on the serial bus, the device address identifying the second device; and
transmit a command from the first device to the second device on the serial bus to identify a type of exchange to be executed in the first direction over the serial bus.

17. The apparatus of claim 14, wherein the direction of data transmission is staggered on the serial bus until each of the one or more bytes of data has been exchanged.

18. The apparatus of claim 14, wherein the processor is further configured to:
cause an early transition in signaling state in the clock signal while a parity bit is transmitted in the first direction on the data line of the serial bus, wherein the early transition causes transmission of data in the first direction to be suspended; and
transmit a first byte of data in the second direction after the parity bit has been transmitted in the first direction.

19. The apparatus of claim 18, wherein the early transition in signaling state is a transition from a low voltage state to a high voltage state.

20. The apparatus of claim 14, wherein the processor is further configured to:
determine that an early transition in signaling state in the clock signal has occurred while transmitting a parity bit in the first direction on the data line of the serial bus;
suspend transmission of data in the first direction in response to the early transition; and
receive a second byte of data that is transmitted in the second direction after completing transmission of the parity bit in the first direction.

21. The apparatus of claim 16, wherein the processor is further configured to:
transmit a sequence start condition (SSC) on the serial bus before transmitting the device address.

22. The apparatus of claim 16, wherein the processor is further configured to:
participate in bus arbitration as a slave device to obtain access to the serial bus before transmitting the device address.

23. The apparatus of claim 16, wherein the first device and the second device are actively bound after the device address is received by the second device.

24. The apparatus of claim 16, wherein the command includes a command code selected from a plurality of available command codes, and wherein the first device and the second device are configured to stagger the direction of data transmission in response to one or more of the plurality of available command codes.

25. The apparatus of claim 16, wherein the processor is further configured to:
transmit a register address from the first device on the serial bus after transmitting the command, wherein the first device and the second device are configured to stagger the direction of data transmission when the register address falls within a range of addresses preconfigured for staggered transmissions.

26. The apparatus of claim 18, wherein the early transition in signaling state is a transition from a high voltage state to a low voltage state.

27. A non-transitory processor-readable storage medium having one or more instructions which, when executed by at least one processor or state machine of a processing circuit, cause the processing circuit to:
initiate a transaction between a first device and a second device to exchange a datagram in a first direction over a serial bus; and
exchange one or more bytes of data in a second direction over the serial bus before the datagram has been completely transmitted,
wherein the first device and the second device alternate as transmitters on the serial bus such that direction of data transmission is staggered on the serial bus,
wherein the serial bus is operated in accordance with a radio frequency front-end (RFFE) protocol, wherein a clock signal is transmitted on a clock line of the serial bus, and wherein each of the first device and the second device is adapted to:
configure a first line driver to operate as a transmitter on a data line of the serial bus for a first number cycles of the clock signal sufficient to transmit one byte of data; and
reconfigure the first line driver to operate as a receiver on the serial bus after the first number cycles of the clock signal have been completed.

28. The storage medium of claim 27, wherein the first device and the second device are actively bound after a command and a device address are received by the second device.

29. An apparatus comprising:
means for initiating a transaction between a first device and a second device to exchange a datagram in a first direction over a serial bus; and
means for exchanging one or more bytes of data in a second direction over the serial bus before the datagram has been completely transmitted,
wherein the first device and the second device alternate as transmitters on the serial bus such that direction of data transmission is staggered on the serial bus, wherein a clock signal is transmitted on a clock line of the serial bus, and wherein each of the first device and the second device is adapted to:
configure a first line driver to operate as a transmitter on a data line of the serial bus for a first number cycles of the clock signal sufficient to transmit one byte of data; and
reconfigure the first line driver to operate as a receiver on the serial bus after the first number cycles of the clock signal have been completed.

30. The apparatus of claim 29, wherein the serial bus is operated in accordance with a radio frequency front-end (RFFE) protocol or a system power management interface (SPMI) protocol, and wherein the first device and the second device are actively bound after a command and a device address are received by the second device.

* * * * *